United States Patent [19]

Neubauer et al.

[11] Patent Number: 4,472,106
[45] Date of Patent: Sep. 18, 1984

[54] PUMPS FOR VISCOUS SUBSTANCES

[75] Inventors: Wilhelm Neubauer, Murr; Herbert Ocker, Leonberg, both of Fed. Rep. of Germany

[73] Assignee: Werner & Pfleiderer, Stuttgart, Fed. Rep. of Germany

[21] Appl. No.: 468,989

[22] Filed: Feb. 23, 1983

[30] Foreign Application Priority Data

Apr. 16, 1982 [DE] Fed. Rep. of Germany ....... 3214019
Nov. 10, 1982 [DE] Fed. Rep. of Germany ....... 3241430

[51] Int. Cl.³ .............................................. F04D 17/00
[52] U.S. Cl. ......................................... 415/66; 415/90
[58] Field of Search .................. 415/65, 66, 76, 90, 415/DIG. 4; 366/97, 147, 149, 301

[56] References Cited
U.S. PATENT DOCUMENTS
3,799,510  3/1974  Schott, Jr. ...................... 366/149 X FOREIGN PATENT DOCUMENTS
958372   1/1957  Fed. Rep. of Germany ...... 366/301
452393   3/1913  France .
1186734  8/1959  France ................................. 415/90
248895   3/1926  Italy ..................................... 415/66

Primary Examiner—Robert E. Garrett
Assistant Examiner—Joseph M. Pitko
Attorney, Agent, or Firm—Laff, Whitesel, Conte & Saret

[57] ABSTRACT

A pump for viscous substances is constructed in such a way that it is constructionally simple and insensitive to foreign bodies. For this purpose, a plurality of shafts which are rotated in the same direction are arranged in a casing. Disks are fitted to the shafts and these disks are substantially clearance-free with respect to the corresponding wall portion of a recess and an adjacent shaft. At least one such disk and at least one adjacent shaft and the associated wall portion of a recess define a chamber. A plurality of such chambers are arranged in series and are interconnected by in each case an overflow duct.

9 Claims, 7 Drawing Figures

PUMPS FOR VISCOUS SUBSTANCES

BACKGROUND OF THE INVENTION

This invention relates to a pump for viscous substances having a casing provided with partially intersecting and substantially circular recesses in which rotary bodies on parallel shafts are arranged having only a limited clearance with respect to the walls of the corresponding recesses, an inlet leading into one recess and an outlet leading from another recess.

Such pumps for viscous substances, which are constructed as gear pumps, are used inter alia as so-called melt pumps, by means of which synthetic substances melted in upstream-connected screw-type machines are supplied to granulating machines. In such applications, it is possible to produce pressures up to 300 bar. The disadvantage of such gear pumps is the high production costs, because all the rotary members are constructed as gear wheels, which mesh with one another, which is simultaneously responsible for their high level of sensitivity to foreign bodies.

German Auslegeschrift No. 2933655 (corresponding to U.S. Ser. No. 935,257) describes an apparatus for processing viscous substances, or substances which become viscous during processing, which has a casing, in whose cylindrical bore is arranged a disk rotor which can be driven in rotary manner and whose closed disks only have a limited clearance with respect to the bore wall. Between axially adjacent disks is defined in each case a chamber, which has an outlet in front of a damming or baffle point. An overflow duct leads from this outlet in the axial direction of the rotor and whilst bridging the corresponding disk, into the chamber located on the other side of the corresponding disk. The damming or baffle member is in each case fixed within the casing. The material which is to be processed, i.e. plasticized, mixed, degassed or reacted undergoes a friction process in each chamber in such a way that it is dammed back before the damming or baffle member, so that there is a relative movement between the substance to be processed and the end faces of the disks, so that liquefying, plasticizing, feeding, pumping, mixing or degassing takes place. However, it is a disadvantage of the known apparatus that the fixed damming or baffle member is not subject to any self-cleaning process and that the transfer between the individual chambers of the viscous substances must take place outside the actual process area, which has a disadvantageous effect on the processing quality.

SUMMARY OF THE INVENTION

The object of the invention is to provide a pump of the aforementioned type which can be more easily constructed and which is less sensitive to foreign bodies.

According to the invention, there is provided a pump for viscous substances having a casing provided with partially intersecting and substantially circular cylindrical recesses in which a plurality of rotary bodies on parallel shafts are arranged having only a limited clearance with respect to the walls of the corresponding recesses, an inlet leading into one recess and an outlet leading out of another recess, wherein the bodies are constructed as closed disks with a circular outer circumference, wherein at least one disk on each shaft has its outer circumference at least substantially clearance-free with respect to at least one adjacent shaft and is axially displaced in largely clearance-free manner with respect to at least one disk of the adjacent shaft, wherein between in each case at least one disk and the adjacent shaft and a wall portion of the associated recess is formed by a chamber, adjacent chambers being interconnected by means of at least one respective overflow duct which is formed in a respective gusset provided in the penetration zone of two adjacent recesses in the casing, and wherein all of the disks are arranged to be driven in the same direction of rotation.

The construction of the pump according to the invention is extremely simple, because it essentially only comprises turned parts. Therefore, it can be constructed in an extremely robust manner. As the material-guiding chambers largely have smooth boundary walls and no extreme cross-sectional changes, the pump is extremely insensitive to foreign bodies. The pump also makes it possible to pump only partially melted material, because between the disks residual melting can take place in accordance with the aforementioned principle. Owing to the robustness and simplicity of construction, it is also possible to pump in a particularly advantageous manner material mixed with filler constituents. As a result of the construction with series-connected chambers, which are successively arranged at right angles to the axial direction of the shafts, the material flow from chamber to chamber takes place roughly in a tangential direction to the disks, i.e. without any significant deflections. This leads on one hand to there being no significant flow and consequently pressure losses, and on the other to there being no undesirable high stressing of the material in narrow deflection zones. Due to the fact that the chambers are bounded by at least one and usually two disks and the associated circumference of the adjacent shaft, a self-cleaning system is obtained.

Preferably, there are at least three shafts, the associated chambers being successively connected in series. In many cases constructions with four to six shafts are particularly preferred. In order to largely eliminate casing friction, i.e. a friction of the material against stationary casing parts, each chamber is desirably axially bounded by two disks. A particularly compact construction results if the shafts are arranged on a curve and particularly on a circle.

The shafts may be arranged to be driven by a centrally arranged drive gear wheel which meshes with respective pinions on the associated shafts. This arrangement has the advantage that no significant additional measures have to be provided in the actual pump. Each shaft may be arranged to be separately driven.

Two approximately diametrically facing chambers may be associated with each disk. In one embodiment, the chambers are successively arranged in two rows with in each case a separate supply duct and a separate discharge duct and with an oppositely directed feed direction. In an alternative embodiment, all the chambers are successively arranged in a row, a reversal of the feed direction taking place in the vicinity of the disk furthest removed from the inlet. In these constructions, the complete circumference of each disk is used for pressure production purposes and the dead space is in each case reduced to a minimum.

BRIEF DESCRIPTION OF THE INVENTION

The invention will now be further described, by way of example, with reference to the drawings, in which.

DESCRIPTION OF PREFERRED EMBODIMENTS

Figure 1:
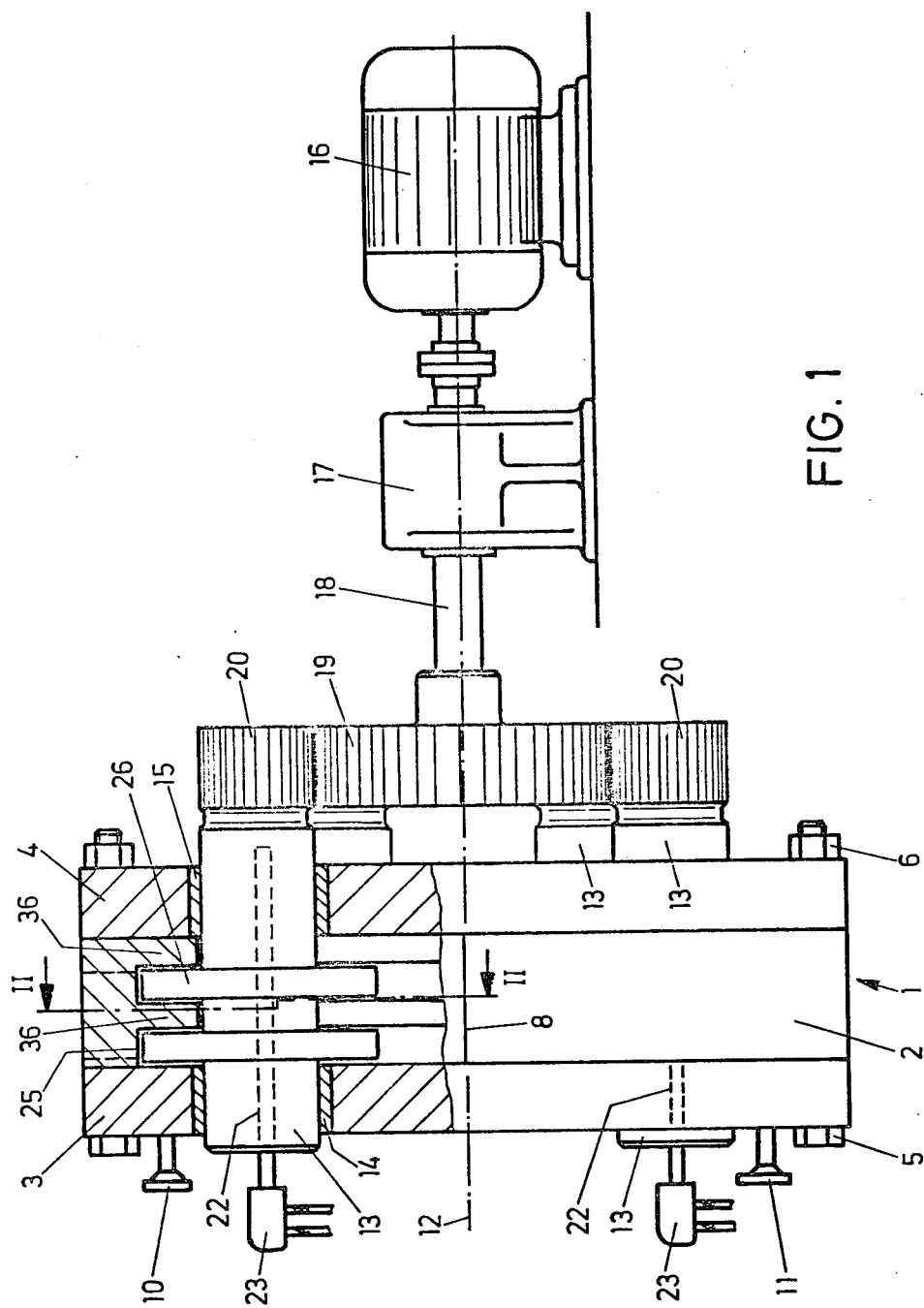
FIG. 1 is a side elevation, partly broken away along the section line I—I in FIG. 2, of one embodiment of a pump according to the invention.

The pump shown in FIGS. 1 to 4 comprises an approximately parallelepipedic casing 1, which also has a casing shell 2, terminally closed by end walls 3, 4 which are screwed to the casing shell 2 by means of long screws 5 with nuts 6. The casing 1 also has a casing core 7 arranged within the casing shell 2 and extending between the end wall 3 and end wall 4 and which is appropriately fixed to one of the latter, e.g. by welding. Appropriately, the casing shell 2 is constructed in split manner in one of the main planes of symmetry of the casing 1, e.g. in a horizontal separating plane 8, in order to facilitate assembly and disassembly of said casing shell 2.

Figure 2:
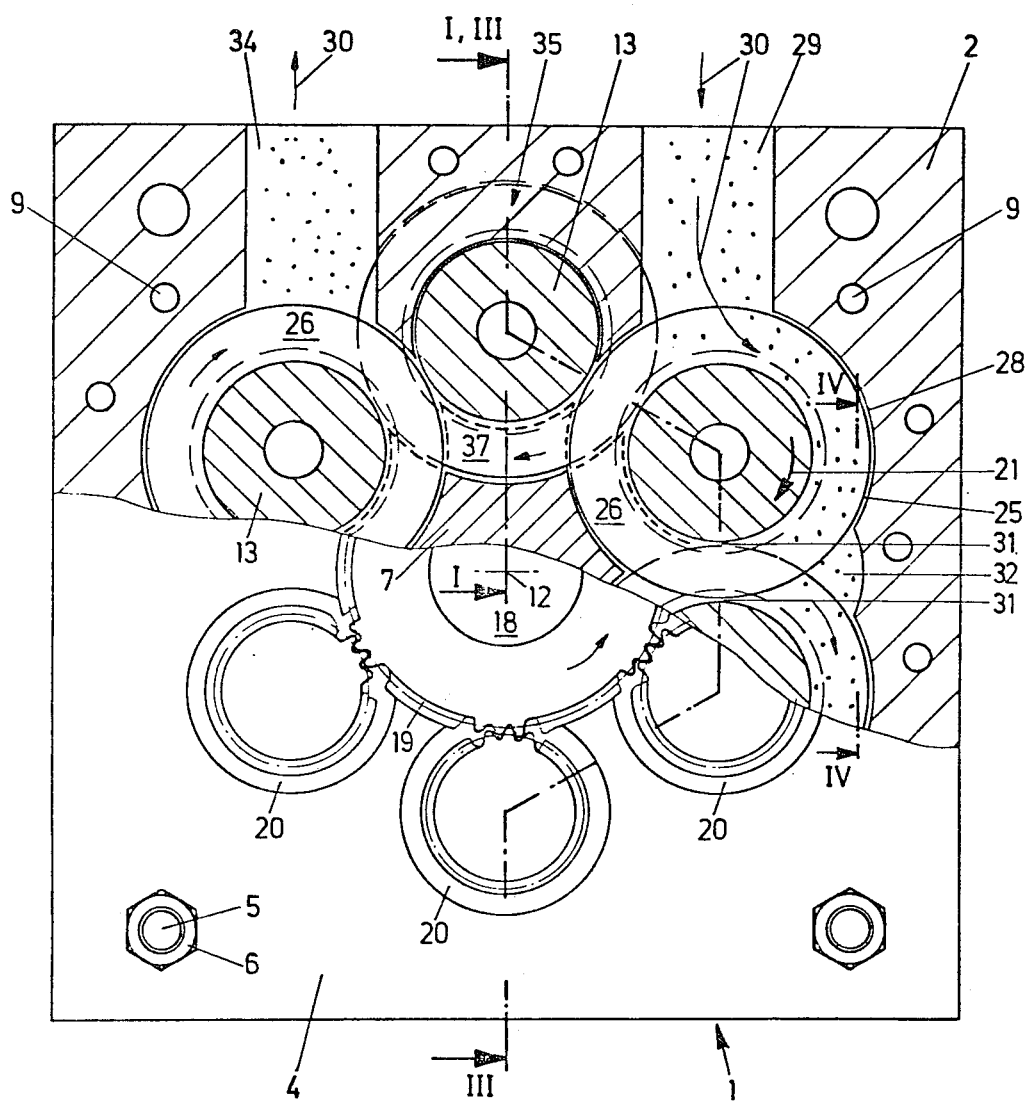
FIG. 2 is a front elevation of the pump in a partly broken away view corresponding to the section line II—II in FIG. 1.
Figure 3:
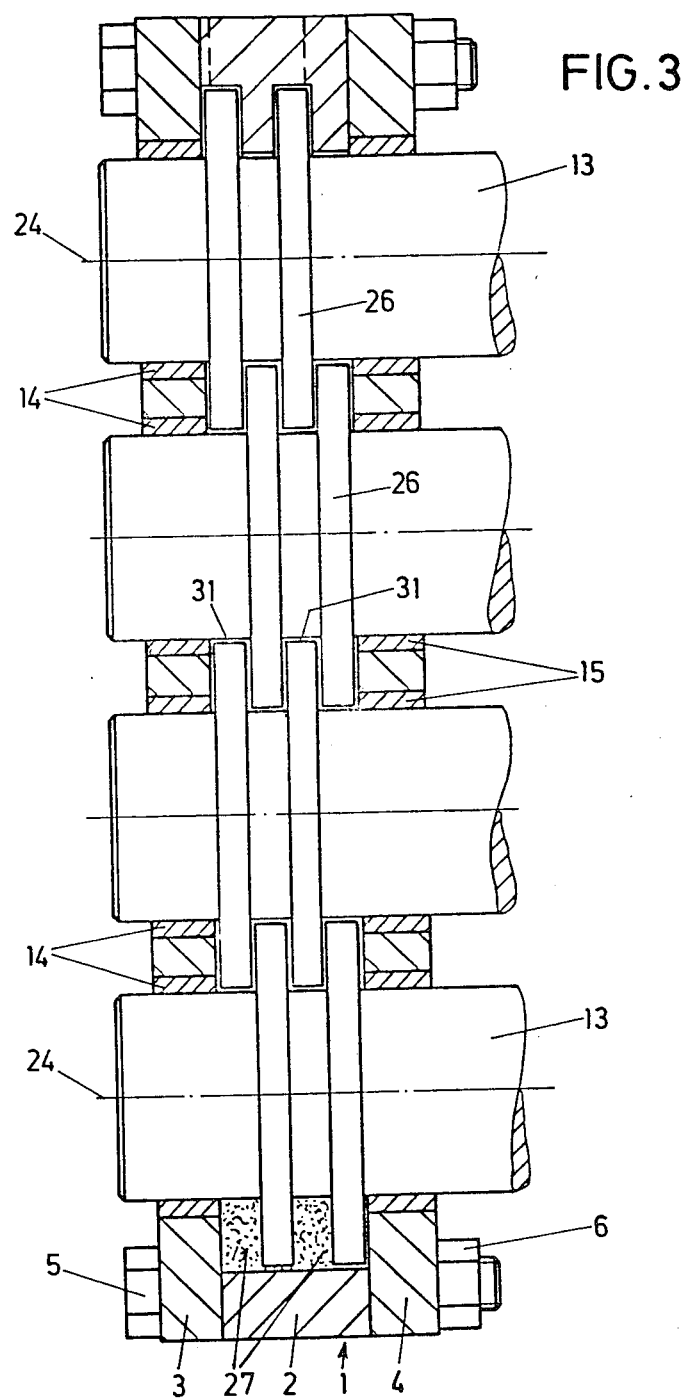
FIG. 3 is a section of the pump taken along the section line III—III of FIG. 2.
Figure 4:
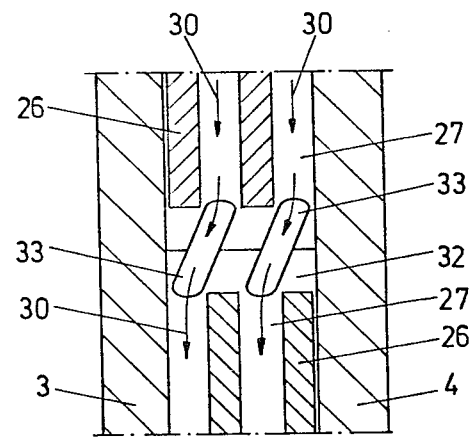
FIG. 4 is a partial section taken along the section line IV—IV of FIG. 2.

As can be gathered from FIG. 2, the casing 1 and more particularly the casing shell 2 is provided with heating flues 9, to which the corresponding flowing heating medium can be supplied by a supply connection 10 and from which it can be removed by a discharge connection 11, each of these connections being fitted to the end wall 3. In the end walls 3, 4, parallel to the median longitudinal axis 12 of the casing 1, are provided a plurality of shafts 13, in the present case six shafts 13, which are mounted in bearings 14, 15 in an externally sealed manner. Bearings 14, 15, which are constructed as sliding bearings, are already tight. As can be seen in FIG. 2, the shafts 13 are arranged uniformly on a circle, i.e. with the same angular distances with respect to the median longitudinal axis 12. The shafts 13 are driven by a motor 16 by means of a back gear 17, to whose driven shaft 18 is fitted a drive gear 19, which is coaxial to the axis 12. This central drive gear 19 meshes with six pinions 20, whereof in each case one is fitted in non-rotary manner to each shaft 13. As a result of the nature of the drive, all shafts 13 are driven in the same direction of rotation indicated by the arrow 21.

The shafts 13 can also be constructed in a heatable manner. By means of heating bores 22 in the shafts 13, heating medium is supplied and removed by corresponding known shaft-pipe couplings 23, which are arranged on the side remote from the drive.

Substantially cylindrical recesses 25 associated with the shafts 13 are formed in the casing shell 2 and in the associated casing core 7. Said recesses 25 are coaxial to the longitudinal axes 24 of said shafts 13. As can be particularly seen in FIG. 2, these recesses 25 are in each case partly formed in the casing shell 2 and partly in the casing core 7.

Closed, circular cylindrical disks 26 are fitted to the shafts 13 and their outer circumference only has a limited, constructionally necessary clearance with respect to the wall of the particular recess 25, which amounts to a maximum of a few tenths of a millimeter. The disks 26 extend in each case up to the two adjacent shafts 13, with respect to which they also have only a constructionally necessary clearance of a maximum of a few tenths of a millimeter. The disks 26 of adjacent shafts 13 are consequently axially displaced with respect to one another, so that therefore between partly overlapping disks (cf FIG. 2) there is only a small, constructionally necessary axial clearance of a few tenths of a millimeter (cf FIG. 3).

As a result of this construction, chambers 27 are formed, which are bounded by two facing end faces of two disks 26 or, in exceptional cases, by one end face of a disk 26 and the assocated inner wall portion of an end wall 3 or 4, with the associated wall portion 28 of the particular recess 25 formed in the casing shell 2 and the associated surface portion of the corresponding shaft 13. Thus, these chambers 27 are preponderantly formed by moving walls.

In the casing 1 and specifically in the casing shell 2, is formed a supply duct 29, through which viscous substances, e.g. substances pumpable by means of the pump, are supplied in a feed direction 30 to a first chamber 27. The rotation direction 21 of shafts 13 and disks 26 is identical with feed direction 30 in the vicinity of chambers 27, so that it is in FIG. 2 clockwise. When viewed in the feed direction, each chamber 27 ends, where the disks or disk 26 defining it engage with the next-adjacent shaft 13 in the feed direction, so that a baffle or damming point 31 is formed there. Immediately before point 31, an overflow duct 33 is in each case formed in the gusset 32 at the penetration point of two adjacent recesses 25 in the casing shell 2 and as a result of which two chambers 27, which are adjacent in the feed direction and which are axially displaced by approximately the width of one disk 26 are interconnected. Thus, as a result of this construction, the viscous material can be fed in the feed direction 30 from chamber 27 to chamber 27, feeding taking place with a continuous pressure increase through the high wall friction between the moving parts and the viscous material. The viscous material is discharged from the last chamber 27 in the feed direction 30 by means of a discharge duct 34 and at a correspondingly high pressure. The shaft 13 with disks 26 arranged between the supply duct 29 and the discharge duct 34 serves as a barrier 35, so that here no chambers are formed and instead the free space between the disks 26 and/or end wall 4 is filled with fillers 36.

Since the chambers 27 and overflow ducts 33 are located in the outer area of the shaft—disk arrangement, it is appropriate to give a minimum size to the dead space filled by the casing core 7. It is therefore advantageous to provide fillers 37 on the casing core 7 and said fillers penetrate the space between two adjacent disks 26 on a shaft 13 or the space between such a disk 26 and the associated end wall 3 or 4 and fill the same to the maximum possible extent.

Figure 5:
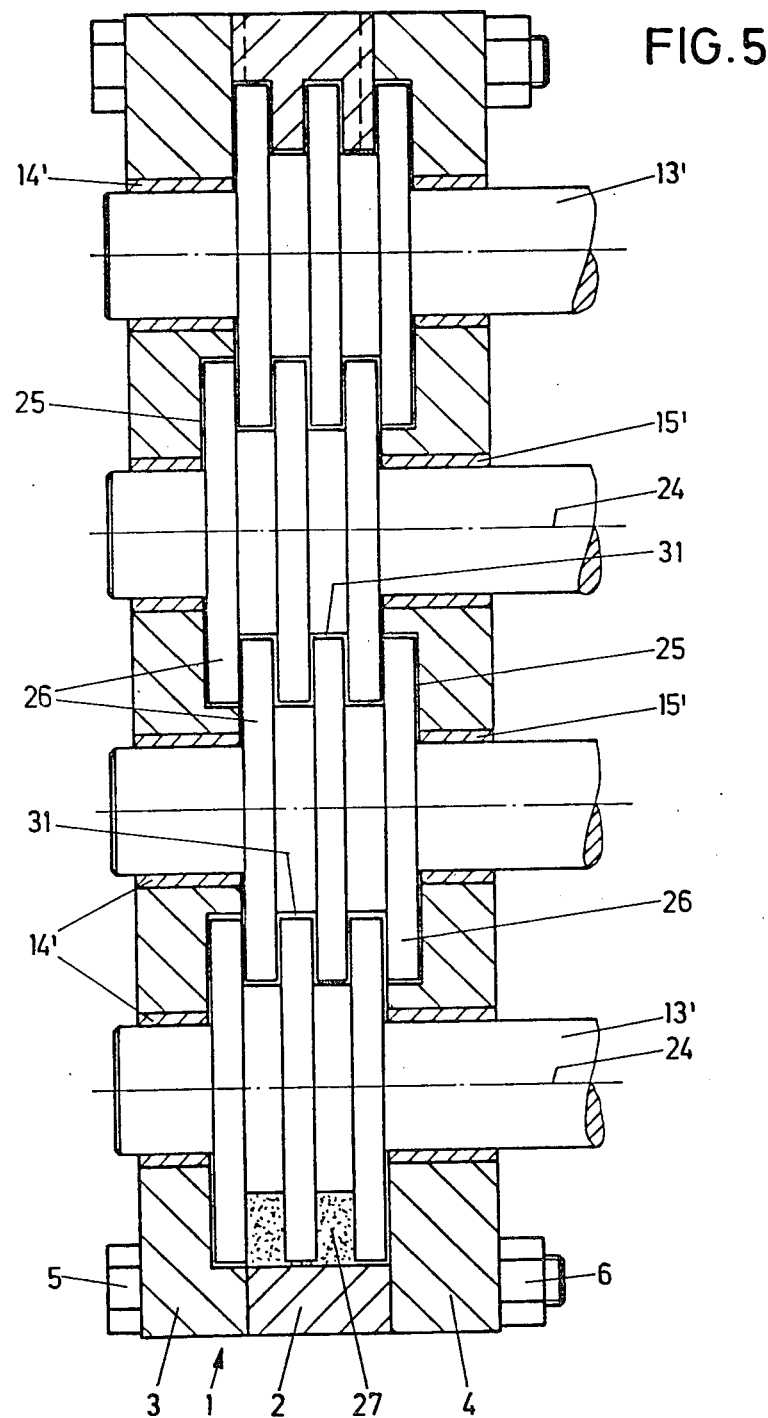
FIG. 5 is a section, corresponding to FIG. 3, of a modified embodiment of a pump according to the invention.

To ensure that chambers 27 on one side are bounded by the associated wall portion of the end wall 3 or 4, it is possible, as shown in FIG. 5, to extend the recess 25 into the corresponding end wall 3 or 4 and specifically by the axial size of a disk 26. In addition, a corresponding disk 26 is additionally provided and arranged in this area, so that then each chamber 27 is axially defined by two disks 26, so that all the main boundary surfaces of one chamber 27 are moved. This leads to a greater pressure increase and, what is even more important, to making the residence time of the substances in the pump even more uniform.

It can be gathered from FIG. 5, that shafts 13' in the area not occupied by disks 26, i.e. in the vicinity of their bearings 14' and outside the casing 1, can be made in a more slender manner. This reduces the material expenditure and also the moment of inertia of the rotary system. Such a constructional solution is also advantageous if the shafts 13' are formed from individual portions. The pressure for viscous substances attainable in such a five-stage pump is 300 bar and higher.

It is obvious that shafts 13 or 13' need not be arranged on a closed curve. They may also be arranged on an open curve, whereby in particular the longitudinal axes of the shafts are all arranged parallel to one another in one plane. However, the represented construction permits a particularly compact arrangement. Furthermore, the relative length of the chambers 27 in the feed direction 30 is particularly great, relative to the diameter of shafts 13 or 13' and disks 26.

Figure 6:
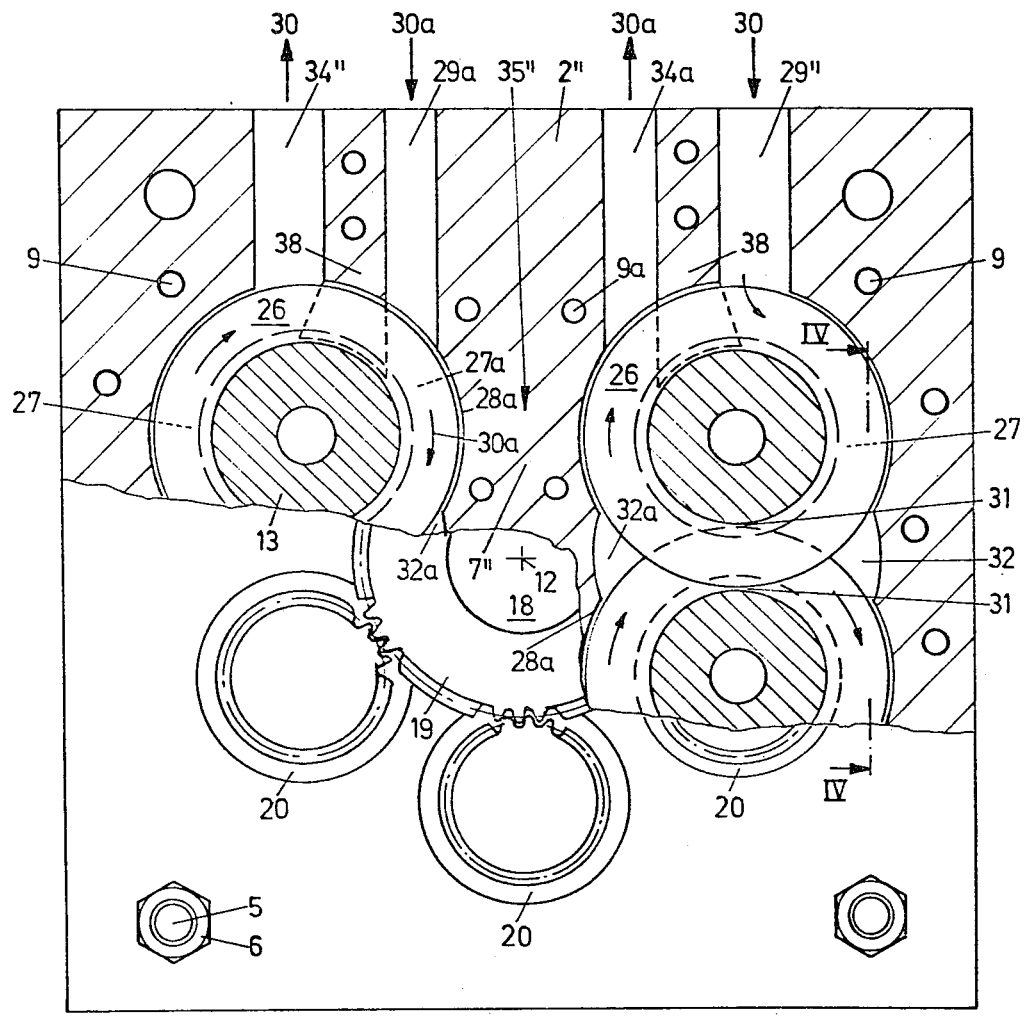
FIG. 6 is a partial section, corresponding to FIG. 2, of yet another modified embodiment of a pump according to the invention.
Figure 7:
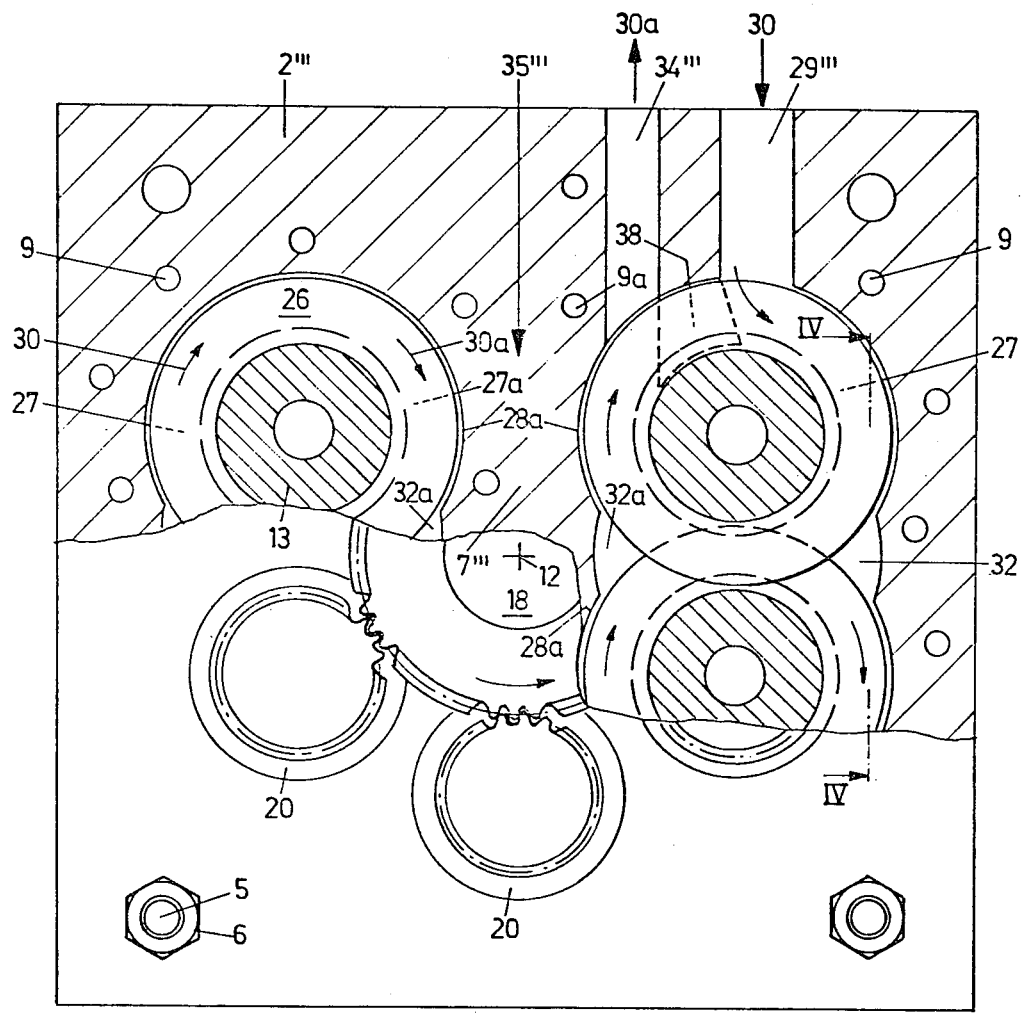
FIG. 7 is a partial section, corresponding to FIG. 2, of a still further modified embodiment of a pump according to the invention.

The modified embodiments according to FIGS. 6 and 7 are constructionally very similar to the embodiments already described. Therefore, identical parts will be given the same reference numerals and functionally identical, but constructionally different parts are followed by two apostrophes in FIG. 6 and by three apostrophes in FIG. 7, the description being limited to what is absolutely necessary for an understanding of these embodiments.

In the construction according to FIG. 6, two material flows are supplied in opposite directions. As in the construction according to FIG. 2, the material is supplied through a supply duct 29" and is fed by means of disks 26 and shafts 13, through chambers 27 and via overflow ducts in gussets 32, in the feed direction 30, to a discharge duct 34", which leads to a pressure increase in the manner described hereinbefore.

In the construction according to FIG. 6, a barrier 35" between the supply side and the discharge side is not formed by a shaft 13 with disks 26, which are omitted here, but is instead formed by an optionally one-piece connection between the casing core 7" and casing shell 2". The casing core 7" has no fillers 37 and instead in the inner area of the shaft—disk arrangement, chambers 27' are constructed between shafts 13, adjacent disks 26 and the associated partially cylindrical wall portions 28a of the casing core 7". The first chamber 27a in this case is supplied with material in the feed direction 30a by a supply duct 29a and by means of a first gusset 32a with overflow ducts to the next chamber or chambers and in this way reaches a discharge duct 34a. In gussets 32a, the overflow ducts are identical with the construction according to FIG. 4, so that there is no need to describe them again. The baffle or damming points 31 are here constituted by the contact points between a disk 26 and the adjacent shaft 13. The drive and heating take place in the manner described in connection with FIG. 2, an upper shaft being omitted and heating flues 9a also being provided in the casing core 7".

The supply duct 29" and discharge duct 34 on the one hand and the discharge duct 34" and supply duct 29a on the other hand are in each case separated from one another by a baffle or damming member 38, which can e.g. also be constructed as a rotary cylinder.

In the construction according to FIG. 7, there is once again a barrier 35" in the vicinity of the inlet and outlet, which is formed by an optionally one-piece connection between the casing shell 2"' and casing core 7"'. Otherwise, the casing core here is constructed in the same way as in the embodiment of FIG. 6 and consequently has cylindrical wall portions 28a for defining additional chambers 27a. There are also gussets 32a with overflow ducts in the casing core. As has already been described on a number of occasions, the material is supplied through a supply duct 29"' and passes through the pump in the feed direction 30 through chambers 27, gussets 32 with overflow ducts and specifically in the outer area of the shaft—disk arrangement up to the last of the latter in the feed direction 30, to which is connected the discharge duct 34 in the embodiment of FIG. 2. The material is merely deflected here and now passes through the inner area of the shaft—disk arrangement in the feed direction 30a, through chambers 27a, gussets 32a and the corresponding overflow ducts to discharge duct 34"'. A baffle or damming member 38 is provided between the supply duct 29"' and discharge duct 34"'.

As a result of the constructions according to FIGS. 6 and 7, in each case the complete disk circumference is used for producing pressure, so that a desired pressure can be obtained with fewer disk—shaft umits. Pressures up to 300 bar and higher can in many cases be obtained with three shaft—disk arrangements. In addition, there are no dead spaces, which leads to a further improvement of the self-cleaning effect.

The invention is not restricted to the above-described embodiments but variations and modifications may be made without departing from the spirit and scope of the invention as defined by the appended claims.

We claim:

1. A pump for viscous substances having a casing provided with partially intersecting and substantially circular cylindrical recesses in which a plurality of rotary bodies on parallel shafts are arranged having only a limited clearance with respect to the walls of the corresponding recesses, a penetration zone formed where said cylindrical recesses partially intersect, an inlet leading into one recess and an outlet leading out of another recess, said bodies being constructed as closed disks with a circular outer circumference, at least one disk on each shaft having its outer circumference at least substantially clearance-free with respect to at least one adjacent shaft and being axially displaced in a largely clearance-free manner with respect to at least one disk of the adjacent shaft, a chamber being formed between each said one disk and said one adjacent shaft and a wall portion of the associated recess, adjacent chambers being interconnected by means of at least one respective overflow duct which is formed in a respective gusset provided in the penetration zone of the two adjacent recesses in the casing, and all of the disks being arranged to be driven in the same direction of rotation.

2. A pump as claimed in claim 1, in which at least three shafts are provided, the associated chambers being successively connected in series.

3. A pump as claimed in claim 1, in which each chamber is axially bounded by two disks.

4. A pump as claimed in claim 1, in which said shafts are arranged on a curve.

5. A pump as claimed in claim 4, in which said shafts are arranged on a circle.

6. A pump as claimed in claim 5, in which said shafts are arranged to be driven by a centrally arranged drive gear wheel which meshes with respective pinions on the associated shafts.

7. A pump as claimed in claim 1, in which two approximately diametrically facing chambers are associated with each disk.

8. A pump as claimed in claim 7, in which said chambers are successively arranged in two rows with in each case a separate supply duct and a separate discharge duct and with an oppositely directed feed direction.

9. A pump as claimed in claim 7, in which all the chambers are successively arranged in a row, a reversal of the feed direction taking place in the vicinity of the disk furthest removed from the inlet.

* * * * *